United States Patent [19]

Becker et al.

[11] Patent Number: 5,902,391
[45] Date of Patent: May 11, 1999

[54] PREPARING INKS FOR OFFSET PRINTING

[75] Inventors: Hans-Jürgen Becker, Neustadt; Thomas Zerbe, Waiblingen; Karl-Wilhelm Klemm, Stuttgart, all of Germany

[73] Assignees: BASF Lacke; Farben AG, both of Muenster, Germany

[21] Appl. No.: 08/851,335

[22] Filed: May 6, 1997

[30] Foreign Application Priority Data

May 13, 1996 [DE] Germany .......................... 196 19 240

[51] Int. Cl.$^6$ .................................................. C09D 11/00
[52] U.S. Cl. .......................................................... 106/31.6
[58] Field of Search ............................................ 106/31.6

[56] References Cited

U.S. PATENT DOCUMENTS 4,747,882  5/1988  Schwartz et al. .................... 106/31.76

FOREIGN PATENT DOCUMENTS

| 0 022 746 A1 | 1/1981 | European Pat. Off. . |
| 0 290 108 B1 | 6/1988 | European Pat. Off. . |
| 0 503 897 A1 | 9/1992 | European Pat. Off. . |
| 678 333 A5 | 8/1991 | Switzerland . |

OTHER PUBLICATIONS

Leach et al., The Printing Ink Manual, 5th ed., Blueprint, London, p. 459, Dec. 1994.

*Primary Examiner*—Mark L. Bell
*Assistant Examiner*—Scott L. Hertzog
*Attorney, Agent, or Firm*—Keil & Weinkauf

[57] ABSTRACT

The invention relates to a process for preparing an offset printing ink or concentrate thereof from the individual components on which the printing ink is based, which involves combining the individual solid and liquid components in a mixer and processing them directly therein to form the offset-printing ink or concentrate.

7 Claims, No Drawings

PREPARING INKS FOR OFFSET PRINTING

The invention relates to a process for preparing offset-printing inks and flowable concentrates thereof in one stage.

Printing inks are normally prepared by dispersing solids, such as color-imparting pigments and auxiliaries, in binders and liquids, for example oils, using dissolvers and ballmills/triple-roll units the binder solutions being obtained beforehand by boiling resins and various additives in oils. This process is technically laborious, drawn out and energy-intensive.

The starting material required for prior art preparation of printing inks comprises at least one, but usually two or more binders of defined rheology which are prepared by heating one, or often more, different resins in an oil mixture at about 180° C. for several hours with stirring. The process involves input of energy by means of a heat transfer oil, which is heated in a separate gas- or oil-fired unit, and operation under inert gas. The product is cooled and then stored until used for further processing. To maintain sufficient reliability of supply, printing-ink producers stock the binders required for the particular range they supply, normally in storage tanks which are heated in order to keep the binders pumpable An alternative storage facility is afforded by containers such as 200 l drums whose contents are heated in a hot chamber prior to use, in order to improve flowability. In the course of storage, factors such as temperature, storage time and the composition of the gas blanket may cause changes to the rheology established during production.

Subsequently, the products are formulated to printing inks as described above.

There has been no lack of attempts to abbreviate and simplify this production process For instance, EP 0 022 746-A1 describes a process in which pigments and specific thermoplastic resins are mixed with one another in the melt or with the addition of solvents, later removed again, the pigmented resins serving as a base material for printing inks; however, there is no description of the actual process of ink production from these pigmented resins EP 0 290 108-B1 describes the pigmenting of thermoplastic polymer binders in an extruder at above the malting point of the binder resin and the addition of a liquid diluent to the mass shortly before or after it leaves the extruder, so as to produce a printing-ink base.

It is an object of the present invention to indicate a process which permits further simplification of the preparation of offset-printing inks without any adverse effect on their quality and which in certain cases actually brings about an improvement in quality.

We have found that this object is achieved by the novel single-stage process.

The present invention provides a process for preparing offset-printing inks or concentrates thereof, starting from the individual components on which the printing ink is based, which comprises combining the individual solid and liquid components in a mixer and processing them directly therein to form the offset-printing ink or concentrate.

In the course of processing by the novel single-stage process the product reaches at least 70° C., and often up to 150° C. with most of the energy required for heating being supplied in the form of mechanical energy.

The viscosity of the offset-printing ink or ink concentrate obtained in accordance with the invention is generally from 10 to 300 Pas measured at 25° C.

The novel procedure does away completely with the need for a separate binder preparation step. The all-in-one preparation process is therefore substantially shorter in terms of time and is much more reproducible owing to the absence of a number of process steps and of intermediate storage.

The pigments can be introduced in the form of dry pigments, pigment precursors or a paste into the mixer.

The present invention also provides offset-printing inks obtained by the novel process and provides for the production of printed products using offset-printing inks prepared in accordance with the invention.

The novel single-stage preparation process for offset-printing inks is much easier and more economical to carry out than the prior-art processes, and the inks it provides are of improved quality, as is evident for example from a reduction in the bronzing effect (change in hue depending on incident light).

Regarding the novel process, offset-printing inks are for the purposes of the invention those inks customary for conventional offset-printing techniques, such as sheet-fed offset, web offset, small offset, continuous form printing and metal decorating, the composition and combination of raw materials in such inks being widely variable. This also applies to the individual solid and liquid components on which the inks themselves are based. The individual solid components may be used in the form of powders, granules or pastes.

Suitable pigments are those customary for offset printing, examples being pigmentary carbon black, phthalocyanine (CI 15), rubin toner (CI 57:1), diaryl yellow (CI 12/CI 13) and the pigments common in the field of spot coloring. It is also possible to employ fillers, such as calcium carbonate, and inorganic pigments.

Examples of suitable hard resins, which can be employed in particle sizes <1 cm, for example, are rosins, hydrocarbon resins, modified rosins, for example those modified with acrylic or maleic acid, modified hydrocarbon resins, for example those modified with rosin or phenolic resin, and also acrylic resins, coumarone resins, indene resins, cyclized rubber, and mixtures of such resins.

Examples of additives are the customary thixotropic agents and thickeners, such as bentonites and/or silicic acid, gelling agents, for example aluminum chelate (=polymeric organic aluminum complex dissolved in dibutyl phthalate and mineral oil), wetting agents, such as soya lecithin, fatty acid esters or polyhydroxystearic acid; siccatives, for example compounds of cobalt and of manganese, and slip compounds, such as the waxes customary for offset-printing inks.

Suitable liquid printing-ink components are vegetable oils and polyesters derived from them (alkyds), based for example on linseed, soya, sunflower, corn, grapeseed, safflower, tall, cottonseed, castor, tung, oiticica and perilla oils, and also mineral oils and organic solvents, for example aliphatic and/or aromatic hydrocarbons of boiling range 150–400° C., for example printing-ink oil (=predominantly paraffinic hydrocarbon mixture comprising 67% of paraffins, 25% naphthenes and 8% aromatics, with a boiling range of 260–290° C., for exampe Mihagan 26/29 B), and also plasticizers, for example esters of adipic acid and citric acid, such as dinonyl adipate, and also isotridecyl alcohol and, if desired, antioxidants (eg. 2,6-di-tert-butylcresol).

The individual solid and liquid components are combined in a mixer in the normal printing-ink proportions and are processed directly therein to the offset-printing ink or concentrate Suitable mixers are those which operate continuously or discontinuously at, for example, about 60 kW/m$^3$. Examples of suitable mixers are twin-screw dissolvers, laboratory blenders (from Waring Commercial) and many others.

The critical factor is that sufficient mechanical energy is supplied. The process can be assisted by additional introduction of heat. However, in certain cases it may even be necessary to employ appropriate cooling to dissipate the heat produced as a result of the input of mechanical energy.

Therefore, a mixer of continuously operating type may be heatable and coolable in sections, while a discontinuous mixer may have means of both heating and cooling.

The process can be carried out in air but in certain cases it may be advantageous to operate under an inert-gas atmosphere so as to avoid inclusions of air. Furthermore, in certain cases it may be of advantage to remove gaseous inclusions by applying reduced pressure. A further possibility is to degas the product by passing it subsequently through a triple-roll mill.

The hard resins, color-imparting pigments and solid auxiliaries are introduced as powders or granules. In the latter case, the energy required to break down the granules must of course also be input.

For certain reasons, but not because of the process itself, it is often desired to introduce certain components, such as color-imparting pigments or other additives, in the form of pastes. This procedure is likewise possible without any disadvantages.

In the case of certain constituents of the formulation which are very sensitive to temperature, it may be advantageous to incorporate these constituents, possibly in paste form, only after the batch has been cooled to below the critical temperature.

The novel process allows an astonishing degree of variability For example, when preparing inks for sheet-fed offset the siccative can be added even in the first step and mixed in. Depending on the user's circumstances, however, the siccative can also be admixed to the finished product. The same applies to other constituents of the formulation. It is thus also possible to prepare a printing-ink concentrate which is subsequently diluted, a procedure which may have certain logistical benefits Parts and percentages below are by weight unless stated otherwise.

EXAMPLE 1

In a laboratory mixer (manufacturer Waring) 52 parts of a mixture comprising:

| | |
|---|---|
| 29.9parts | of printing-ink oil (boiling range 260°–290° C.) |
| 11.77parts | of coatings-grade linseed oil |
| 4.9parts | of castor oil and |
| 3.6parts | of a mixture of |
| | -20% di-tert-butylcresol |
| | -10% dinonyl adipate |
| | and 70% printing-ink oil (boiling range 260° C.–290° C.) |
| 0.3part | of isotridecyl alcohol |
| 1.5parts | of long-oil linseed oil alkyd and |
| 0.03part | of aluminum chelate | are admixed with 48.0 parts of a mixture, comminuted beforehand in a laboratory mill (manufacturer: Ika), comprising:

| | |
|---|---|
| 30.8parts | of rosin-modified phenolic resin |
| 16.7parts | of Pigment Red 57 and |
| 0.5part | of PTFE wax | and the mixture is stirred for 5 minutes, during which it reaches 123° C.

The desired rheology is established by stirring in 2% of isotridecyl alcohol and 4% printing-ink oil. The formulation is then passed once through a triple-roll mill.

COMPARISON EXAMPLE

A mixture comprising

| | |
|---|---|
| 16.7parts | of Pigment Red 57, |
| 0.5part | of PTFE wax and |
| 2.9parts | of a mixture of |
| | -20% di-tert-butylcresol |
| | -10% dinonyl adipate |
| | and 70% printing-ink oil (boiling range 260–290° C.) |
| 3.5parts | of coatings-grade linseed oil |
| 2.0parts | of printing-ink oil (boiling range 260–290° C.) |
| 4.9parts | of castor oil |
| 62.2parts | of binder A and |
| 7.3parts | of binder B | is predispersed in a dissolver. After further dispersion in a ballmill, isotridecyl alcohol and the printing-ink oil (eg. Mihagan 26/29 B) are stirred in to adjust the rheology to match that of Example 1. Finally, the formulation is passed once through a triple-roll mill.

Binder A was prepared by stirring and at the same time heating, at 180° C. for two hours, a mixture comprising

| | |
|---|---|
| 38.2parts | of rosin-modified phenolic resin |
| in 15.2parts | of coatings-grade linseed oil |
| 13.6parts | of printing-ink oil (boiling range 260°–290° C.) and |
| 0.3part | of a mixture of |
| | -20% of di-tert-butylcresol |
| | -10% of dinonyl adipate |
| | and 70% of printing-ink oil (boiling range 260–290° C.) and also |
| 20.0parts | of long-oil linseed oil alkyd. |

Following the addition of

| | |
|---|---|
| 2.3 parts | of printing-ink oil (boiling range 260–290° C.) and |
| 0.4 part | of aluminum chelate, | the mixture is held at 180° C. for 30 minutes more. Following the addition of

| | |
|---|---|
| 10.0 parts | of coatings-grade linseed oil | the batch was filtered and cooled.

Binder B was prepared by stirring and at the same time heating, at 190° C. for two hours, a mixture comprising

| | | |
|---|---|---|
| 44.8 | parts | of rosin-modified phenolic resin |
| in | | |
| 10.7 | parts | of coatings-grade linseed oil |
| 33.0 | parts | of printing-ink oil (boilng range 260–290° C.) |
| 0.5 | part | of isotridecyl alcohol and |
| 1.0 | part | of a mixture of |
| | | -20% of di-tert-butylcresol |
| | | -10% of dinonyl adipate |
| | | and 70% of printing-ink oil (boiling range 260–290° C.) |

Following the addition of

| 10.0 parts | of printing-ink oil (boiling range 260° C.–290° C.), |
|---|---| the mixture was filtered and cooled.

EXAMPLE 2

Determining the bronzing effect (Measuring instrument% Optronic Colour flash 45; illuminant D65/2°)

The novel preparation method also leads, surprisingly, to a reduction in the effect known as bronzing (change in hue depending on incident light).

This disruptive effect is readily discernible in the case of semi-hiding rubin toners, for example Litholrubin D 4560 DD (from BASF) or Irgalithrubin LPBC (from Ciba-Geigy). After coating with a solution varnish (or lamination) this optical effect disappears completely.

Test inks of identical composition prepared either conventionally or in accordance with the invention were printed onto coated paper, and half of the print was coated with a dispersion varnish. Since this effect becomes particularly visible over blacks, a lack substrate was chosen. The color difference of the respective print with and without varnish is then determined.

The greater this color difference $\Delta E$; the greater the bronzing of the unvarnished print.

The inks pigmented with 17% Litholrubin prepared by the novel process exhibit a bronzing effect which is reduced by 28% in comparison with that shown by corresponding but conventionally prepared inks.

We claim:

1. A process for preparing an offset printing fink or concentrate thereof from individual solid and liquid components on which the offset printing ink is based, which process comprises combining the individual solid and liquid components in a mixer and processing them directly therein all in a single stage to form the offset printing ink or concentrate.

2. A process as claimed in claim 1, wherein processing takes place at from 70 to 150° C.

3. A process as claimed in claim 1, wherein processing takes place at from 70 to 150° C., and wherein heating energy is supplied in the form of mechanical energy alone or in the form of mechanical energy assisted by additional introduction of heat.

4. A process as claimed in claim 1, wherein the viscosity of the ink or concentrate is from 10 to 300 Pas, measured at 25° C.

5. A process as claimed in claim 1, wherein pigments are added as dry pigments or pigment precursors.

6. A process as claimed in claim 1, wherein at least some of the pigments are added as a paste.

7. An offset-printing ink prepared by a process as claimed in claim 1.

* * * * *